(12) United States Patent
Waterman et al.

(10) Patent No.: US 11,317,132 B2
(45) Date of Patent: Apr. 26, 2022

(54) SYSTEMS AND METHODS FOR GENERATING NEW CONTENT SEGMENTS BASED ON OBJECT NAME IDENTIFICATION

(71) Applicant: Rovi Guides, Inc., San Jose, CA (US)

(72) Inventors: Alan Waterman, Merced, CA (US); Sahir Nasir, San Jose, CA (US)

(73) Assignee: Rovi Guides, Inc., San Jose, CA (US)

(*) Notice: Subject to any disclaimer, the term of this patent is extended or adjusted under 35 U.S.C. 154(b) by 67 days.

(21) Appl. No.: 16/714,418

(22) Filed: Dec. 13, 2019

(65) Prior Publication Data

US 2021/0185376 A1 Jun. 17, 2021

(51) Int. Cl.
| | |
|---|---|
| *G06N 20/00* | (2019.01) |
| *H04N 21/266* | (2011.01) |
| *H04N 21/2668* | (2011.01) |
| *G06N 3/08* | (2006.01) |
| *H04N 21/25* | (2011.01) |

(52) U.S. Cl.
CPC ............ *H04N 21/252* (2013.01); *G06N 3/08* (2013.01); *G06N 20/00* (2019.01); *H04N 21/2668* (2013.01); *H04N 21/26603* (2013.01)

(58) Field of Classification Search
CPC .......... H04N 21/252; H04N 21/26603; H04N 21/2668; G06N 3/08; G06N 20/00
See application file for complete search history.

(56) References Cited

U.S. PATENT DOCUMENTS

| | | | | |
|---|---|---|---|---|
| 10,019,654 B1* | 7/2018 | Pisoni | ............ | G06N 3/084 |
| 10,299,008 B1* | 5/2019 | Catalano | ............ | H04N 21/4884 |
| 2002/0170068 A1* | 11/2002 | Rafey | ............ | H04N 21/458 725/112 |
| 2013/0130843 A1 | 5/2013 | Burroughs et al. | | |
| 2013/0138687 A1 | 5/2013 | Hsiao et al. | | |
| 2016/0014482 A1 | 1/2016 | Chen et al. | | |
| 2017/0024614 A1 | 1/2017 | Sanil et al. | | |
| 2017/0083628 A1 | 3/2017 | Frenkel et al. | | |
| 2017/0332125 A1* | 11/2017 | Panchaksharaiah | ............ | H04N 21/26283 |
| 2019/0035091 A1 | 1/2019 | Bi et al. | | |

(Continued)

OTHER PUBLICATIONS

U.S. Appl. No. 16/714,196, filed Dec. 13, 2019, Alan Waterman.

*Primary Examiner* — Benjamin R Bruckart
*Assistant Examiner* — Tien M Nguyen
(74) *Attorney, Agent, or Firm* — Haley Guiliano LLP

(57) ABSTRACT

Systems and methods are disclosed herein for generating new content segments based on object name identification. A content segment may be received from a device and a content structure is generated based on the content segment. The content structure includes objects each having attributes. The system may search a contact database associated with the device to identify a matching entry of the contact database with a particular object. The comparison matches metadata of the matching entry with an attribute of the particular object. Upon matching, the first object is modified to include a name attribute based on the matching metadata of the matching entry. In response to receiving a request using the name of the particular object to create a new content segment, the system inserts the particular object into a new content structure and a new content segment is generated for display from the new content structure.

16 Claims, 19 Drawing Sheets

(56) References Cited

U.S. PATENT DOCUMENTS

| | | |
|---|---|---|
| 2019/0163982 A1 | 5/2019 | Block |
| 2019/0251364 A1 | 8/2019 | Park et al. |
| 2020/0311434 A1* | 10/2020 | Iyer .................... G06K 9/00751 |

* cited by examiner

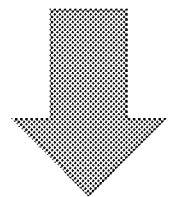
FIG. 2A

211
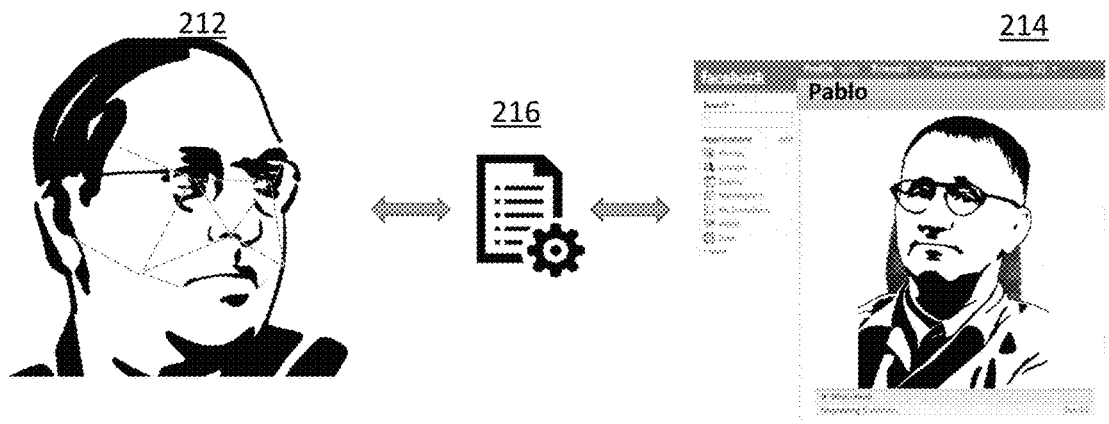
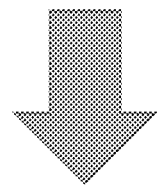
FIG. 2B 222
224
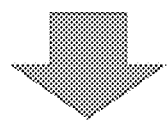
Attribute Table    226    Mapping
| Pablo | 1a | 1b |
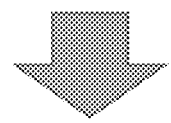
228
FIG. 2C

400

500

600

Pseudo code

```
content_structure_ID = CS133
    attribute_table_ID = AT131
        object_data_structure_ID = ODS134
            description_structure_ID = DS135
                object_ID = 111
                    object_type = human
                        object_feature_0 = male
                        object_feature_1 = 40_years
                        object_feature_2 = blue_jeans
                        object_feature_3 = brown_wavy_hair
                        object_feature_4 = latino
                        object_feature_5 = 5'11"
                        ...
                        object_state_0 = determined
                        object_state_1 = running
                        object_state_2 = sliding
                        object_state_3 = flailing
                        object_state_4 = falling
                        object_state_5 = grimacing
                object_ID = 112
                    object_type = 1980_dodge_charger
                        object_feature_0 = orange
                        object_feature_1 = dusty
                        object_state_1 = driving
                object_ID 113
                    object_type = AR-15_rifle
                        object_state_0 = used
                object_ID=114
                    object_type = foot
                        object_feature_0 = army_boot
                        object_feature_1 = shiny_black
            action_structure_ID = AS136
                action_0 (111, 112, sliding_across)
                action_1 (111, 113, holding)
                ...
```

Pseudo code

```
content_structure_ID = CS133
    mapping_ID = M132
        for (object_ID = 111, 00:00 – 00:11)
            object_state = [0, 00:00 – 00:02, 27], [1, 00:02 – 00:05, 35], [2, 00:05-
            00:07,99], [3, 00:05 – 00:08,35], [4, 00:07- 00:08, 78], [5, 00:08-00:11,
            45]

absolute_location = [00:00 – 00:02,(11.34, 23.34, 23.87)], [00:02-
            00:07, (12.02, 21.23, 05.67)], [00:07-00:11, (12.10, 11.13, 05.45)]

relative_location = [112, 00:00 – 00:02, (2.7, 30°)], [113, 00:02-00:07,
            (12.7, 47°)], [114, 00:07-00:11, (11.13, 132°)]
``` absolute_motion = $[00:00 – 00:02,(\vec{v}_1)], [00:02-00:7, (\vec{v}_2)], [00:07-00:11, (\vec{v}_3)]$ Relative_motion = $[112, 00:00 – 00:02,(\vec{v}_4)], [113, 00:02-00:7, (\vec{v}_5)], [113, 00:07-00:11, (\vec{v}_6)], [114, 00:08 – 00:11, (\vec{v}_7)]$

```
        for (object_ID = 112, 00:00 – 00:07)
            ...
```

START

↓

1102 Receive a content segment from a device

↓

1104 Generate a content structure based on the content segment, wherein the content structure comprises a plurality of objects including a first object and an attribute of the first object

↓

1106 Search a contact database associated with the device to identify a matching entry of the contact database based on comparing metadata of the matching entry with the attribute of the first object

↓

1108 Modify the first object to include a name attribute based on the metadata of the matching entry of the contact database

↓

1110 Request received to create a new content segment including name attribute of first object?

— NO → END

YES ↓

1112 Insert the first object into a new content structure

↓

1114 Generate for display a new content segment based on the new content structure

↓

END

FIG. 11

SYSTEMS AND METHODS FOR GENERATING NEW CONTENT SEGMENTS BASED ON OBJECT NAME IDENTIFICATION

BACKGROUND

The present disclosure is directed to techniques for alteration of content segments, and more particularly to techniques for generating reduced content structures from content segments.

SUMMARY

Electronic devices may be used to create new content segments of desired subject matter. However, it remains technically challenging to create content segments, especially when creating content segments for human objects for which there is no available preexisting reference content to access for reconstruction. For example, a user may wish to create a new content segment of a known person to the user, such as creating a rendering of how their friend would look on a skiing vacation. If no available preexisting reference content (e.g., pictures or video clips that identify the friend) exist for the known person, a completely new digital construction process is required to generate a content segments for the known person. In one approach, live action filming is required. Another approach provides for digital animation tools used by human artists to produce an animation. Digital editing (e.g., animation) still requires human creation of models as well as labor-intensive programming to define attributes, motion paths, and features of the hand-drawn models which are subsequently rendered frame by frame to produce visual effects.

Accordingly, techniques are disclosed herein for automatically generating a new content segment based on searching contact databases for a matching entry for an object. Once created, this content segment with a matching entry for an object can be automatically used to generate (e.g., on request) new content structures that include the object. In some embodiments, a content segment may be received from a device and a content structure is generated based on the content segment. The content structure includes objects each having attributes (e.g., object name). The system may search a contact database associated with the device, such as a social-network, to identify a matching entry of the contact database with a particular object. The comparison matches metadata of the matching entry of the contact database with an attribute of the particular object. Upon matching, the first object is modified to include a name attribute based on the matching metadata of the matching entry of the contact database. In response to receiving a request using the name of the particular object to create a new content segment, the system inserts the particular object into a new content structure and a new content segment is generated for display from the new content structure.

This provides an improvement to the problem of creating new content segments by automatically modifying the first object of the new content segment to include a name attribute based on metadata from a matching entry from a contact database. For example, a user may have video footage of a friend surfing. The surfing footage is deconstructed and a new content segment for the friend is created. If the user wishes to create a video showing the friend snowboarding, the newly created content segment of the friend is recalled and used to create a new video of the friend snowboarding. Exemplary content structures that can be used for generating new content structures and rendered into a content segment are described by co-pending application Ser. No. 16/363,919 entitled "SYSTEMS AND METHODS FOR CREATING CUSTOMIZED CONTENT," filed on Mar. 25, 2019, which is hereby expressly incorporated by reference herein in its entirety.

In some embodiments, the new content segment may be transmitted to a recipient identified based on the metadata of the matching entry of the contact database. An electronic address of the recipient based on the metadata may be determined. After a determination of the electronic address, the type of communication network associated with the electronic device is determined. The system may then transmit the new content segment to the recipient based on the electronic address on the determined communication network.

The system may compare, using an image recognition technique, an image from the matching entry (e.g., profile photo) with an attribute of the first object during the comparison of metadata of the matching entry with the attribute of the particular object. In some embodiments, the image recognition technique comprises a machine learning model implemented on control circuitry. The machine learning model may implement at least one of a neural network or parallel processing.

In some embodiments, the content structures further include virtual modelling data (e.g., vectoring data) for the objects and attribute table entries. The generated content segment includes determining matching virtual modelling data of the matching object including the identified attribute table entry. The content segment is rendered (e.g., a 3D animation) and generated for output based on the matching virtual modelling data. Exemplary content structures utilizing virtual modelling data are provided in co-pending application Ser. No. 16/451,823 entitled "SYSTEMS AND METHODS FOR CREATING CUSTOMIZED CONTENT," filed on Jun. 25, 2019, which is hereby expressly incorporated by reference herein in its entirety.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which:

FIG. 2A shows an illustrative diagram illustrating generation of a content structure from a content segment, in accordance with some embodiments of the disclosure;

FIG. 2B shows an illustrative diagram illustrating modification of an attribute of an object for a content structure, in accordance with some embodiments of the disclosure;

FIG. 2C shows an illustrative diagram illustrating creation of a new content segment, in accordance with some embodiments of the disclosure;

FIGS. 6A-B provide pseudo-code examples of exemplary content structures, according to some embodiments described herein;

FIG. 11 is an illustrative flowchart of a process for generating new content segments based on object name identification, in accordance with some embodiments of the disclosure.

DETAILED DESCRIPTION

Figure 1A:
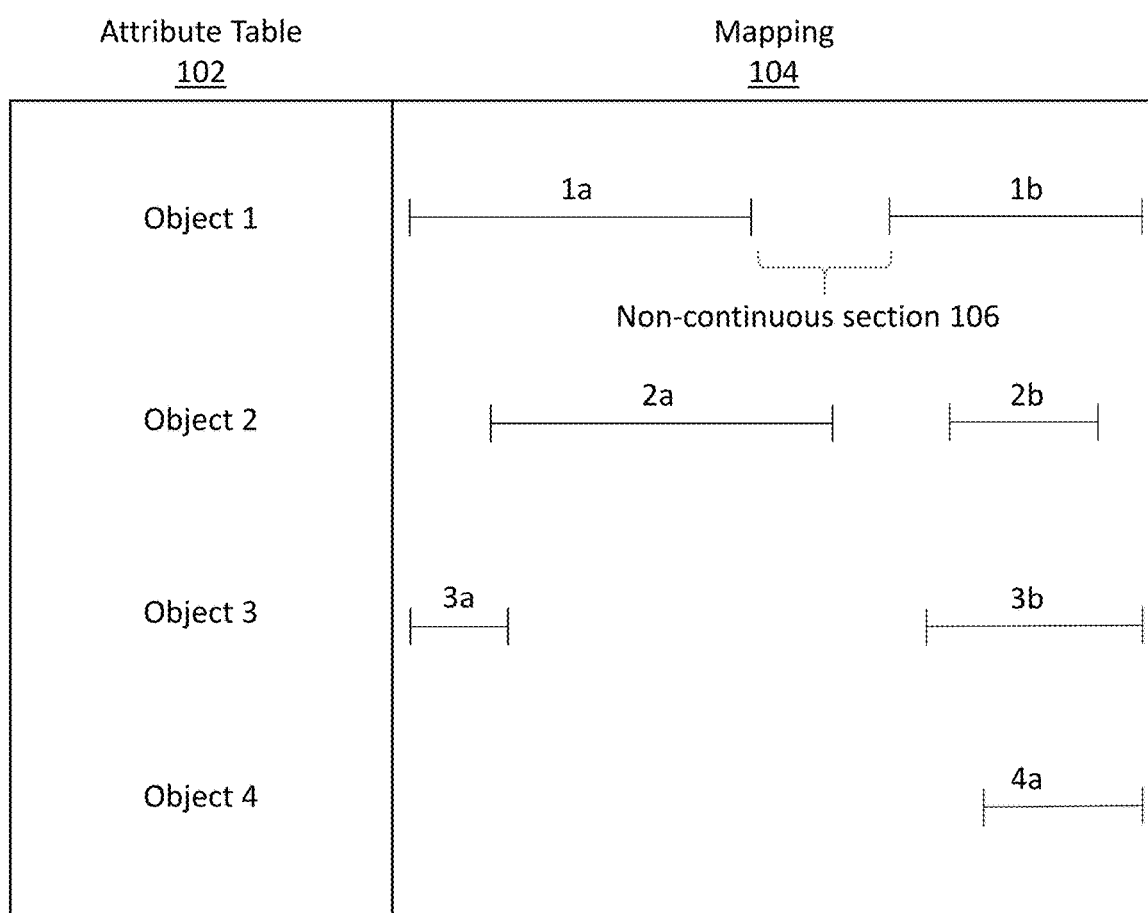
FIG. 1A shows an illustrative diagram for a content structure comprising a plurality of objects illustrating non-continuous mappings, in accordance with some embodiments of the disclosure.

FIG. 1A shows an illustrative diagram 100 for a content structure comprising a plurality of objects illustrating non-continuous mappings, in accordance with some embodiments of the disclosure. The exemplary content structure 101 is illustrated, which includes an attribute table 102 and mapping 104. Specifically, attribute table 102 may include object data structures including object 1, object 2, object 3, and object 4. In some embodiments, the object data structures include attribute table entries such as descriptive structures, action structures, audio structures, and other similar sub-structures. Attribute table entries may be attributes (e.g., such as object name), states, actions, or other types of substructures within the attribute table. For example, a descriptive structure may list attributes such as object name, object type (e.g., face), features (e.g., for face object type: blond hair, brown eyes, specific lip shape, etc.), states (e.g., smiling, frowning, eyes closed, raised-eyebrows, etc.). The features and states may include different attributes based on the object type. The mapping 104 corresponding to the attribute may include a value indicative of a rate or a degree at which the attribute is taking place or appearing.

In some embodiments, a content segment that includes a plurality of objects may be received by the system that includes a processing engine. For example, a system may receive a video clip of friends at a batting cage for baseball batting practice. In some embodiments, the content segment may be received from a user device such as a mobile smartphone that transmits the content segment over a communications network (e.g., Internet, Bluetooth, NFC, hardware connection, etc.) to a system that includes a processing engine. In other embodiments, the content segment is received from a third-party server, which transmits the content segment to the system. In some embodiments, the system itself creates the content segment by image capture means such as an embedded video camera.

The processing engine may generate a content structure based on the content segment. The content structure includes a plurality of objects. Returning to FIG. 1, a content structure 101 based on the content segment may be generated based on a number of objects detected within the content segment. Particularly, Jon is represented as Object 1, while his friends are Object 2, Object 3, and Object 4 respectively. See FIGS. 2B and 2C. In some embodiments, image recognition techniques may be used to determine the objects from the content segment. In other embodiments, metadata containing information about the content segment may be parsed and analyzed to determine the objects from the content segment. In yet other embodiments, express information from the transmitter may provide information associated with the content segment describing the specific objects within the content segment. The information may be time-based to determine when the object appears within the content segment. As mentioned earlier, exemplary content structures that can be used for generating new content structures and rendered into a content segment are described by co-pending application Ser. No. 16/363,919 entitled "SYSTEMS AND METHODS FOR CREATING CUSTOMIZED CONTENT," filed on Mar. 25, 2019, which is hereby expressly incorporated by reference herein in its entirety.

The processing engine may identify a primary object from the plurality of objects. The content structure includes a plurality of objects. Returning to FIG. 1A, a content structure 101 based on the content segment may be generated, and a primary object may be identified from the plurality of objects. In this example, the primary object is identified as Jon. In some embodiments, the primary object is determined based on information received from the transmitter (e.g., metadata or express information). In other embodiments, the primary object may be identified based on specific pre-defined rules. For example, the primary object may be the object that appears most in the content segment. In another example, the primary object may be the object associated with a profile associated with the transmitter.

The primary object includes first and second mappings indicating first and second time periods when the primary object appears in the content segment. In some embodiments, the first and second time periods are separated by a time gap. Object 1 in FIG. 1A includes two mappings 1A and 1B which are separated by a non-continuous section 106. Continuing from the above example, Jon (i.e., Object 1) is seen to appear in the video frame at 15:00-20:00 (i.e., 1A) during his first round of batting practice and then exits the video frame. Jon returns into the video frame at 30:00-35:00 (i.e., 1B) for his second round of batting practice. The first and second mappings may be separated by a time gap between 20:00-30:00 (i.e., 106). Object 2 with mappings 2A and 2B, Object 3 with mappings 3A and 3B, and Object 4 with mapping 4A are further examples of objects with their respective mappings.

Figure 1B:
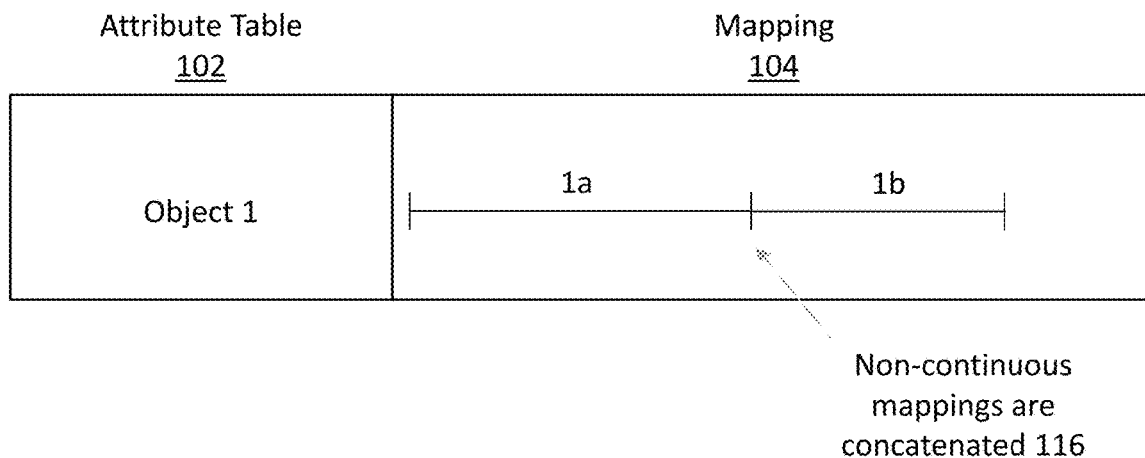
FIG. 1B shows an illustrative diagram for a new content structure for a single object, in accordance with some embodiments of the disclosure.
Figure 1C:
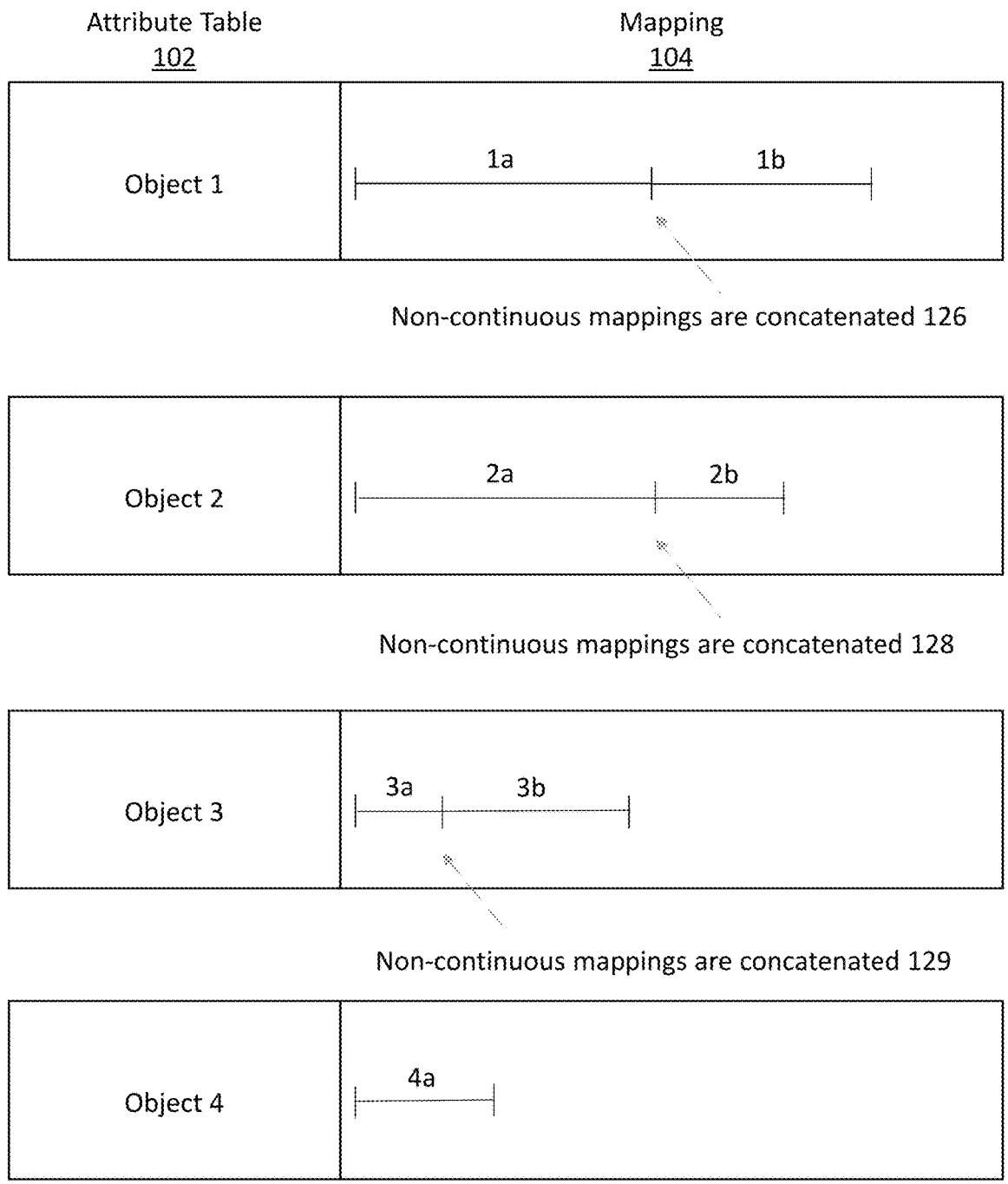
FIG. 1C shows an illustrative diagram for a plurality of new content structures, in accordance with some embodiments of the disclosure.

The processing engine may generate a new content structure comprising the primary object. The first and second mappings of the primary object, being non-continuous, may be concatenated to remove the time gap. In one embodiment, FIG. 1B shows an illustrative diagram 111 for a new content structure generated for a single object, in accordance with some embodiments of the disclosure. Object 1 having mappings 1A and 1B, is altered to concatenate the mappings together 116. By concatenating the mappings, the playback of Object 1 mappings gives the impression that the time-gap between the mappings has been removed. Additionally, this allows for playback of all the mappings of Object 1 to be sequential and continuous. In another embodiments, FIG. 1C shows an illustrative diagram 121 for a plurality of newly generated content structures, in accordance with some embodiments of the disclosure. Object 1 has concatenated mappings (126) for mappings 1A and 1B. In similar fashion, Object 2 and Object 3 have concatenated mappings 128 and 129. Continuing from the above example, Jon's second batting practice clip (i.e., 1B) follows immediately after Jon's first batting practice clip (i.e., 1A). The new content structures in this embodiment have only the respective object as part of the new content structure.

A new content segment may be generated based on the new content structure, and this new content segment may be transmitted from the processing engine to an electronic device. The transmission from the processing engine to the electronic device may be via a communications network (e.g., Internet, Bluetooth, NFC, hardware connection, etc.) to an electronic device, a server, network storage, or other device. Continuing from the above example, a new video clip is generated based on the concatenated clips of Jon's batting practice, and this new video clip is sent to Jon's mobile phone.

In some embodiments, the processing engine may identify one or more objects from the plurality of objects for the generation of the new content structure. For example, in FIG. 1, the processing engine may identify Object 1, Object 2, Object 3, and Object 4. Continuing from the above example, the processing engine may identify Jon (i.e., Object 1) and his three friends (i.e., Object 2, Object 3, and Object 4).

The processing engine may identify, for each object, mappings indicating time periods when the object appears in the content segment. For example, in FIG. 1, the processing engine may identify the corresponding mappings to the objects. For example, Object 1 has mappings 1A and 1B, Object 2 has mappings 2A and 2B, Object 3 has mappings 3A and 3B, and Object 4 has mapping 4A.

The processing engine may determine whether any of the one or more mappings of the object overlap with at least one section of noncontinuous mapping of the first and second mappings. For example, in FIG. 1, Object 2 has mapping 2A that overlaps with the noncontinuous mapping 106 of Object 1. Continuing from the above example, Jon's friend (i.e., Object 2) enters the frame during the noncontinuous mapping.

Figure 1D:
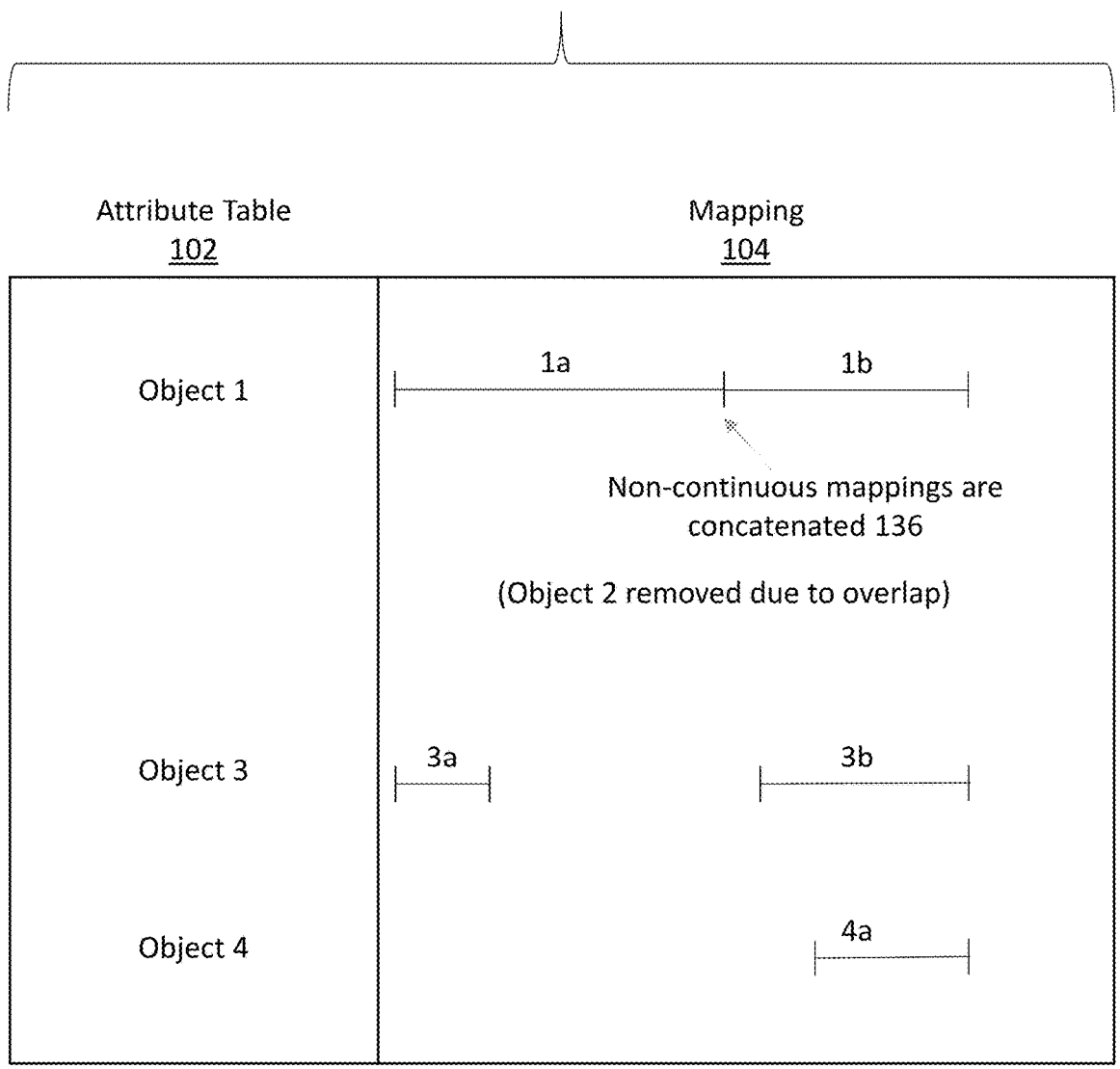
FIG. 1D shows an illustrative diagram for a new content structure, in accordance with some embodiments of the disclosure.

The processing engine may, in response to the determination that the one or more mappings of the object overlap with the at least one section of noncontinuous mapping of the first and second mappings, exclude the object from the generation of the new content structure. FIG. 1D shows an illustrative diagram 131 for a new content structure, in accordance with some embodiments of the disclosure. Because mapping 2A overlapped with the noncontinuous mapping 106 from FIG. 1A, Object 2 is excluded from the new content structure 132. Furthermore, the primary object (i.e., Object 1) has mappings 1A and 1B concatenated to remove noncontinuous mapping 136. Continuing from the above example, Jon's friend (i.e., Object 2) is removed from the new content structure. This may provide for a smoother viewing experience as there will not be any immediate disappearance of objects upon concatenation of the objects in the new content structure. In some embodiments, the processing engine may determine, for each object, whether an attribute of the object from the new content structure matches a human identifier. In response to the determination that the attribute of the object from the new content structure does not match the human identifier, the processing engine excludes the object from the generation of the new content structure. For example, this comparison provides that only objects which are human objects are included in the new content structure. It is contemplated that the processing engine may be configured with other predetermined rulesets to exclude various types of object based on preference.

In some embodiments, the processing engine may determine whether an attribute of the primary object from the new content structure matches an identifier from a social-networking data structure. If so, the contact data associated with the identifier from the social-networking data structure may be retrieved, and the new content segment may be transmitted to an electronic device associated with the contact data. The identifier may be any type of data, image, sound, video, or other means for identification of an object. This may include the identifier being from a social-networking data structure that includes images (e.g., a profile picture of a person) associated with a particular social-networking account. For example, if the face attribute of Object 1 (Jon) from the new content structure matches (e.g., via image recognition) a profile photo for a friend Jon on a Facebook® account, then Jon's contact information is retrieved from Facebook® (e.g., via API, other means for application integration, crawling techniques, or manual data extraction), and the new content segment is sent to Jon's contact via Facebook.

In some embodiments, the processing engine may retrieve environmental templates from a data structure. The environmental templates may include green screens, outer space, ocean, beach, or other similar environmental settings. The environmental templates include environmental content structures that include corresponding objects. Objects from the environmental content structure may be retrieved and added to the new content structure. Continuing from the above example, the new content structure which only contains the Jon object and corresponding mapping may be modified to add an environmental template such that Jon may be put into a beach environment with objects such as sand, sun, and water in the new content structure.

FIG. 2A shows an illustrative diagram 200 illustrating generation of a content structure from a content segment, in accordance with some embodiments of the disclosure. The content segment 202 is deconstructed by a deconstruction engine into one or more pieces of data. This may be done using parsing, image recognition, or other means to deconstruct the image. The pieces of data are then reconstructed by a reconstruction engine to generate a content structure 204, which includes objects in an attribute table and corresponding mappings. The processing engine may receive the content segment. In some embodiments, the content segment may be received from a user device such as a mobile smartphone, which transmits the content segment over a communications network (e.g., Internet, Bluetooth, NFC, hardware connection, etc.) to a system that includes a processing engine. In other embodiments, the content segment is received from a third-party server, which transmits the content segment to the system. In some embodiments, the system itself creates the content segment by image capture means such as an embedded video camera.

The processing engine may generate a content structure based on the content segment. The content structure comprises objects including a first object and an attribute of the first object. For example, an attribute of a first object may be a name attribute. Continuing from the example above, if the object is for a human object Jon, the name attribute for the object would be populated as "Jon." The attribute may be any other type of attribute within the content structure.

The processing engine may search a contact database associated with the device to identify a matching entry of the contact database based on comparing metadata of the matching entry with the attribute of the first object. The contact database associated with the device may be a third-party server such as a social-networking server (e.g., Facebook, Twitter, Instagram, Pinterest, etc.). The contact database may be an email service, an electronic service, a contacts application on an electronic device, or any type of service that contains contact information for one or more users. The type of metadata may be any type of metadata associated with the matching entry from the contact database, such as an image (e.g., profile photo, other photos), information related to the user (e.g., date of birth, college attended, etc.). A match may be an identical match of values or a sufficient pass of a predefined threshold value. For example, if the metadata is a profile picture and this is compared to the face attribute of the object, image recognition comparison may be based on the comparison passing a predefined threshold for similarity (e.g., based on similar landmarks on the face, or RGB values, or other image recognition comparison techniques). In some embodiments, the image recognition techniques may be implemented on control circuitry where a machine learning model implements neural networks or parallel processing. FIG. 2B shows an illustrative diagram 211 illustrating modification of an attribute of an object for a content structure, in accordance with some embodiments of the disclosure. Continuing from the above example, if the content segment contains only Jon's friends, the face attribute of one of Jon's friends is analyzed by image recognition techniques 212. This is compared by the processing engine 216 to the Facebook® profile of Jon's friend Pablo 214. The comparison results in a match.

The processing engine may modify the first object to include a name attribute based on the metadata of the matching entry of the contact database. Continuing from the example above, the generated content structure modifies the object to have the name attribute Pablo 218.

The processing engine may modify the first object to include a name attribute based on the metadata of the matching entry of the contact database. Continuing from the example above, the generated content structure modifies the object to have the name attribute Pablo 218.

In response to receiving a request using the name of the particular object to create a new content segment, the processing engine inserts the particular object into a new content structure and a new content segment is generated for display from the new content structure. FIG. 2C shows an illustrative diagram 222 illustrating creation of a new content segment, in accordance with some embodiments of the disclosure. Continuing from the above example, in response to receiving a request from Jon's mobile phone to create a new content segment for Pablo, the first object Pablo 224 is inserted into the new content structure 226 and the processing engine generates for display the new content segment on Jon's mobile phone 228.

In some embodiments, the processing engine transmits the new content segment to a recipient identified based on the metadata of the matching entry of the contact database. In some embodiments, the transmission to the matching entry of the contact database includes determining the electronic address of the recipient based on the metadata of the matching entry of the contact database and determining the type of communication network associated with the determined electronic address. The processing engine then transmits the new content segment to the recipient based on the electronic address on the determined communication network. Continuing from the above example, in response to receiving a request from Jon's mobile phone to create a new content segment for Pablo, the processing engine determines Pablo's electronic address by determining the account by Facebook's Instant Messaging Application (Pablo's account on Facebook's Instant Messaging Application), which operates over the Internet. The processing engine then transmits the new content segment to Pablo's account on Facebook's Instant Messaging Application.

In some embodiments, objects within the content structure may include attributes where one attribute is a vectorized representation of the object. Upon object identification, a content deconstruction engine may generate a vector data structure (e.g., set of vectors defining multiple polygons) based on each object. The vector data structure for an object may include data defining interconnected vectors or polygons, such that when those vectors or polygons are rendered or rasterized (e.g., by a graphics engine) the resulting rendering or raster represents the same object or resembles the object with sufficient similarity. The content deconstruction engine may generate a different vector set (e.g., three sets of vectors) for three different time periods. The vector sets may then be stored as part of content structure.

In some embodiments, the vectorized representation of an object includes vectorized representation of a sub-portion of the first object. Each object may be further subdivided into sub-objects, each having its own vector sets associated with sub-portions of the object. Each of these sub-objects may be separately vectorized and stored in the content structure in the same was as other objects. Each of these sub-objects may have vector sets with associated relative location mappings defining the presence in different time periods.

In some embodiments, the deconstruction engine may modify the vectorized representation of the object comprising removing a portion of vectors of the vectorized representation of the object and adding new vectors to the vectorized representation of the object. Because content structure fully defines vector sets for all objects, the objects may be fully reconstructed by the content construction engine from the content structure. For example, the content construction engine may create a new content segment by reconstructing objects (e.g., by converting vectors to raster images) in a frame-by-frame manner. As mentioned previously, exemplary content structures utilizing virtual modelling data are provided in co-pending application Ser. No. 16/451,823 entitled "SYSTEMS AND METHODS FOR CREATING CUSTOMIZED CONTENT", filed on Jun. 25, 2019, which is hereby expressly incorporated by reference herein in its entirety.

Figure 3A:
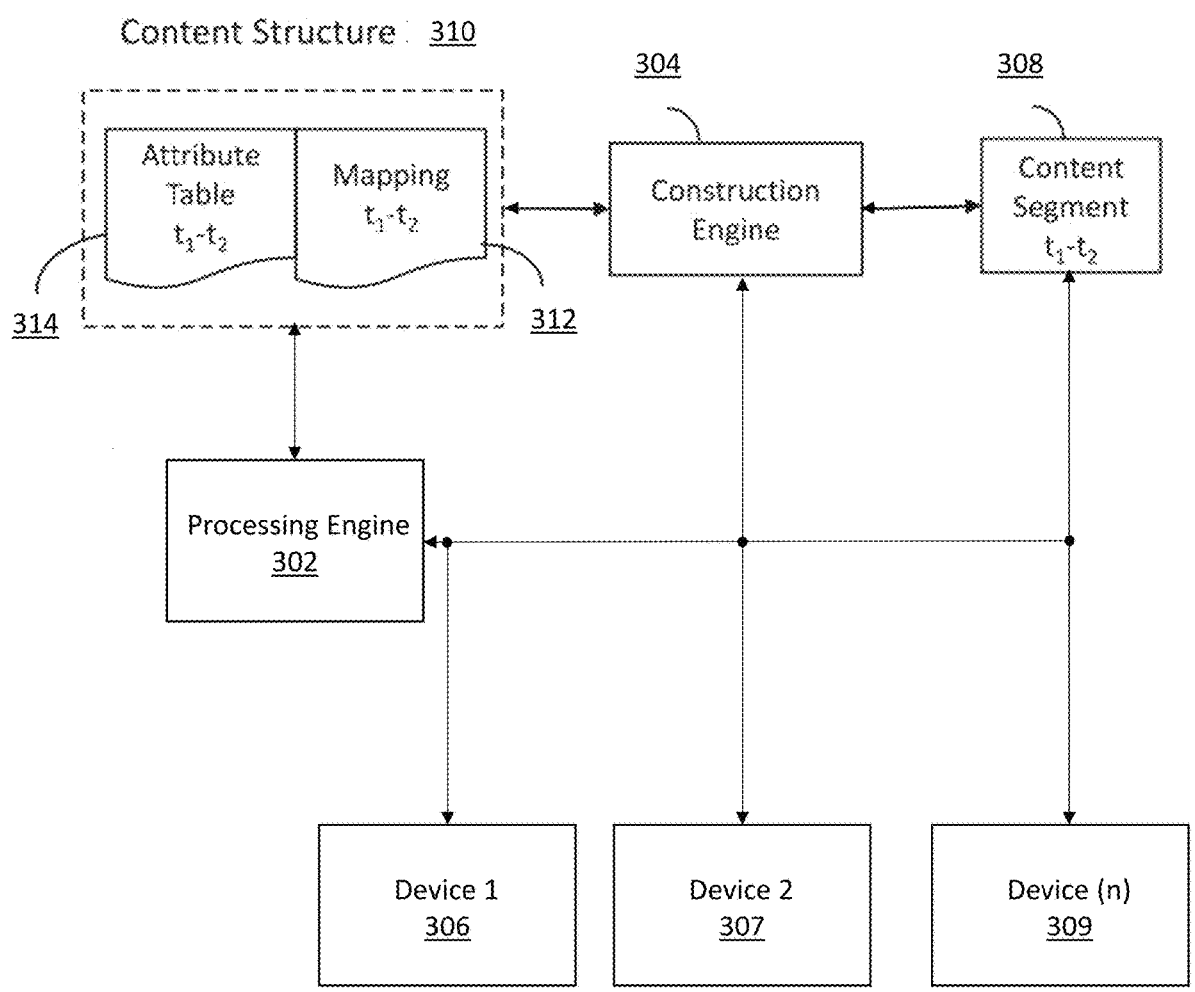
FIG. 3A shows an illustrative system diagram of the processing engine, the content structure, the construction engine, the content segment, and devices, in accordance with some embodiments of the disclosure.

FIG. 3A shows an illustrative system diagram 300 of the processing engine, the content structure 310, the construction engine 304, the content segment 308, and devices 306, 307, and 309, in accordance with some embodiments of the disclosure. The linguistics processing engine 302 may be of any hardware that provides for processing and transmit/receive functionality. The processing engine may be communicatively coupled to multiple electronic devices (e.g., device 1 (306), device 2 (307), device n (309)). The processing engine may be communicatively coupled to a content structure 310, a construction engine 304, content segment 308. As illustrated within FIG. 3, a further detailed disclosure on the processing engine can be seen in FIG. 4 showing an illustrative block diagram of the processing engine, in accordance with some embodiments of the disclosure.

Figure 3B:
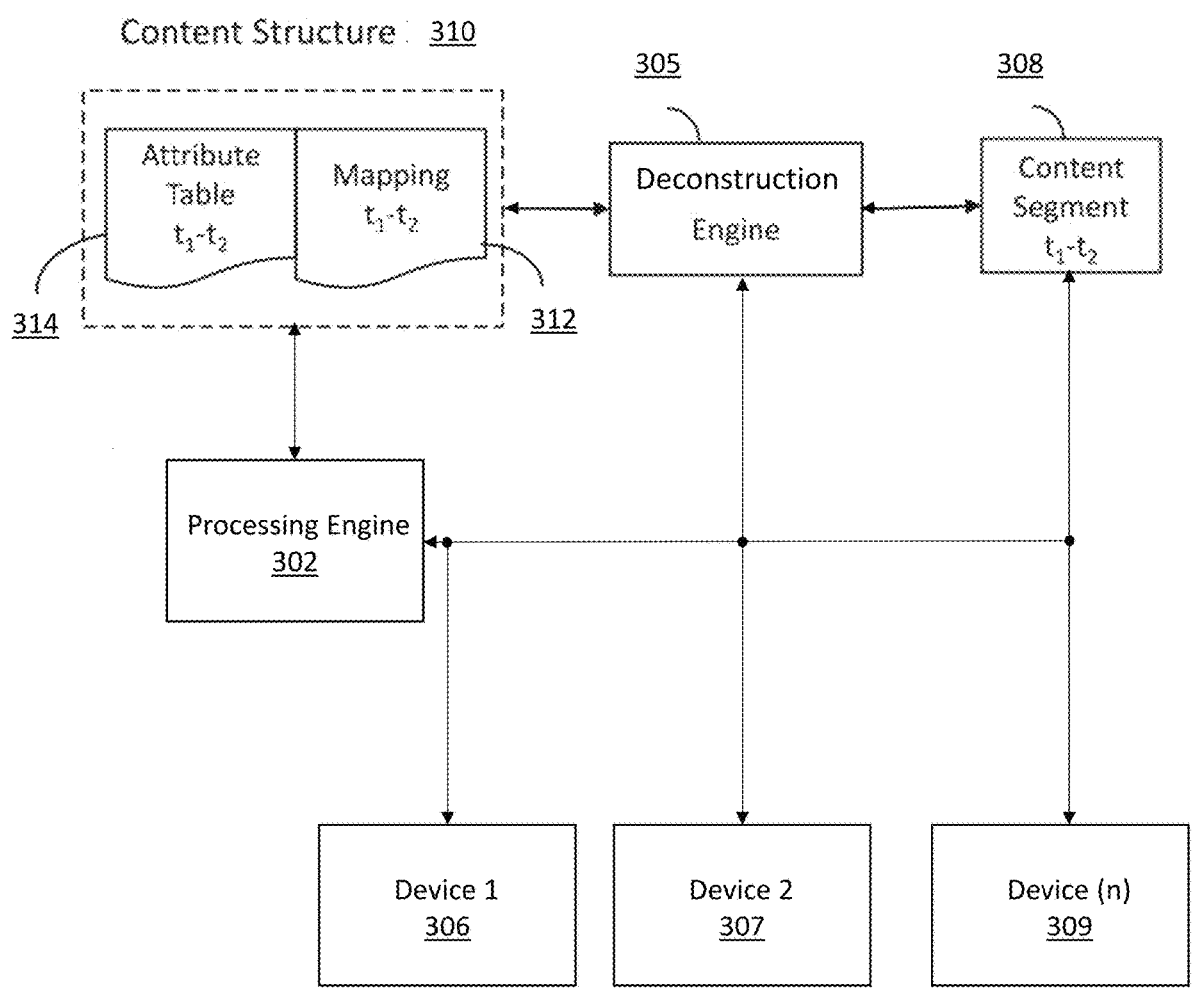
FIG. 3B shows an illustrative system diagram of the processing engine, the content structure, the deconstruction engine, the content segment, and devices, in accordance with some embodiments of the disclosure.
Figure 4:
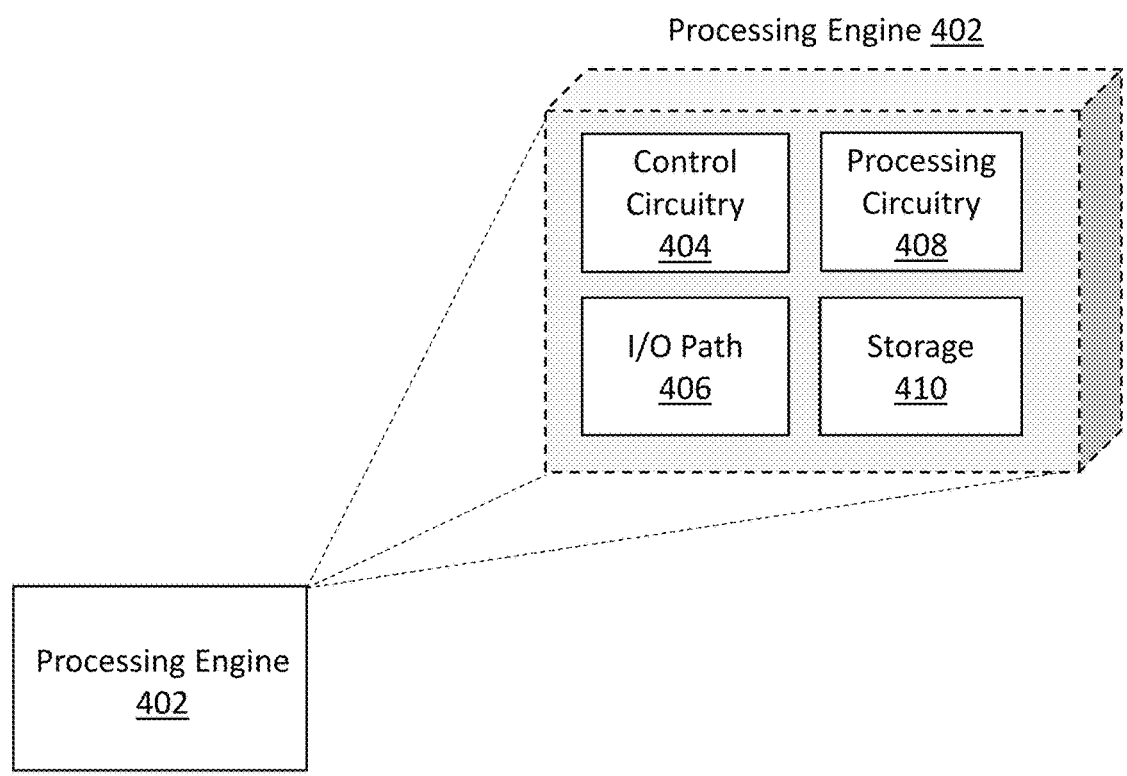
FIG. 4 shows an illustrative block diagram of the processing engine, in accordance with some embodiments of the disclosure.

FIG. 3B, similar to FIG. 3A, shows an illustrative system diagram 300 of the processing engine, the content structure 310, a deconstruction engine 305, the content segment 308, and devices 306, 307, and 309, in accordance with some embodiments of the disclosure. The processing engine may be communicatively coupled to a content structure 310, a deconstruction engine 305, content segment 308.

In some embodiments, the processing engine may be implemented remote from the devices 306-309 such as a cloud server configuration. The processing engine may be any device for retrieving information from the devices 306-309 and identifying and/or parsing textual and other information from media content played on devices 306-309. The processing engine may be implemented by a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, Internet-of-Things device, wearable device, or wireless device, and/or combination of the same. Any of the system modules (e.g., processing engine, data structure, ISP, and electronic devices) may be any combination of shared or disparate hardware pieces that are communicatively coupled.

In some embodiments, the construction engine may be implemented remote from the electronic devices 306-309 such as a cloud server configuration. The construction engine may be any device for accessing the content structure and generating content segments as described above. The construction may be implemented by a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, Internet-of-Things device, wearable device, or wireless device, and/or combination of the same. Any of the system modules (e.g., processing engine, data structure, ISP, and electronic devices) may be any combination of shared or disparate hardware pieces that are communicatively coupled.

In some embodiments, the processing engine, construction engine, and a device from devices 306, 307, and 309 may be implemented within a single local device. In other embodiments, the processing engine and construction engine may be implemented within a single local device.

The electronic devices (e.g., device 1 (306), device 2 (307), device n (309)) may be any device that has properties to transmit/receive network data as well as an interface to playback media content (e.g., touch screen, speakers, keyboard, voice command input and confirmation, or any other similar interfaces). The devices 306, 307, and 309 may be implemented by a television a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, Internet-of-Things device, wearable device, or wireless device, and/or combination of the same.

The content structure 310 may be any database, server, or computing device that contains memory for receiving and transmitting data related to the attribute table 314 and mapping 312. The content structure may be cloud based, integrated into the processing engine, construction engine, and/or integrated into one of the devices 306, 307, and 309. In some embodiments, the content structure is communicatively coupled to both the processing engine 302 and the construction engine 304.

The content segment 308 may be any data or information which is generated by the construction server 304. The content segment may be transmitted by the construction server 304 to any of the devices 306, 307, and 309. The content segment may be communicatively coupled to the devices 306, 307, and 309, the construction engine 304, and the processing engine 302.

FIG. 4 shows an illustrative block diagram 400 of the processing engine, in accordance with some embodiments of the disclosure. In some embodiments, the processing engine may be communicatively connected to a user interface. In some embodiments, the processing engine may include processing circuitry, control circuitry, and storage (e.g., RAM, ROM, hard disk, removable disk, etc.). The processing engine may include an input/output path 406. I/O path 406 may provide device information, or other data, over a local area network (LAN) or wide area network (WAN), and/or other content and data to control circuitry 404, that includes processing circuitry 408 and storage 410. Control circuitry 404 may be used to send and receive commands, requests, signals (digital and analog), and other suitable data using I/O path 406. I/O path 406 may connect control circuitry 404 (and specifically processing circuitry 408) to one or more communications paths.

Control circuitry 404 may be based on any suitable processing circuitry such as processing circuitry 408. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a processing engine stored in memory (e.g., storage 410).

Memory may be an electronic storage device provided as storage 410, that is part of control circuitry 404. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

The processing engine 402 may be coupled to a communications network. The communication network may be one or more networks including the Internet, a mobile phone network, mobile voice or data network (e.g., a 5G, 4G or LTE network), mesh network, peer-to-peer network, cable network, or other types of communications network or combinations of communication networks. The processing engine may be coupled to a secondary communication network (e.g., Bluetooth, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

FIG. 4B shows an illustrative block diagram 401 of the construction engine, in accordance with some embodiments of the disclosure. The construction engine may perform each of the operations individually or collaboratively. In some embodiments, the construction engine may be communicatively connected to a user interface. In some embodiments, the construction engine may include processing circuitry, control circuitry, and storage (e.g., RAM, ROM, hard disk, removable disk, etc.). The construction engine may include an input/output path 406. The construction engine may be coupled to a communications network.

Figure 5:
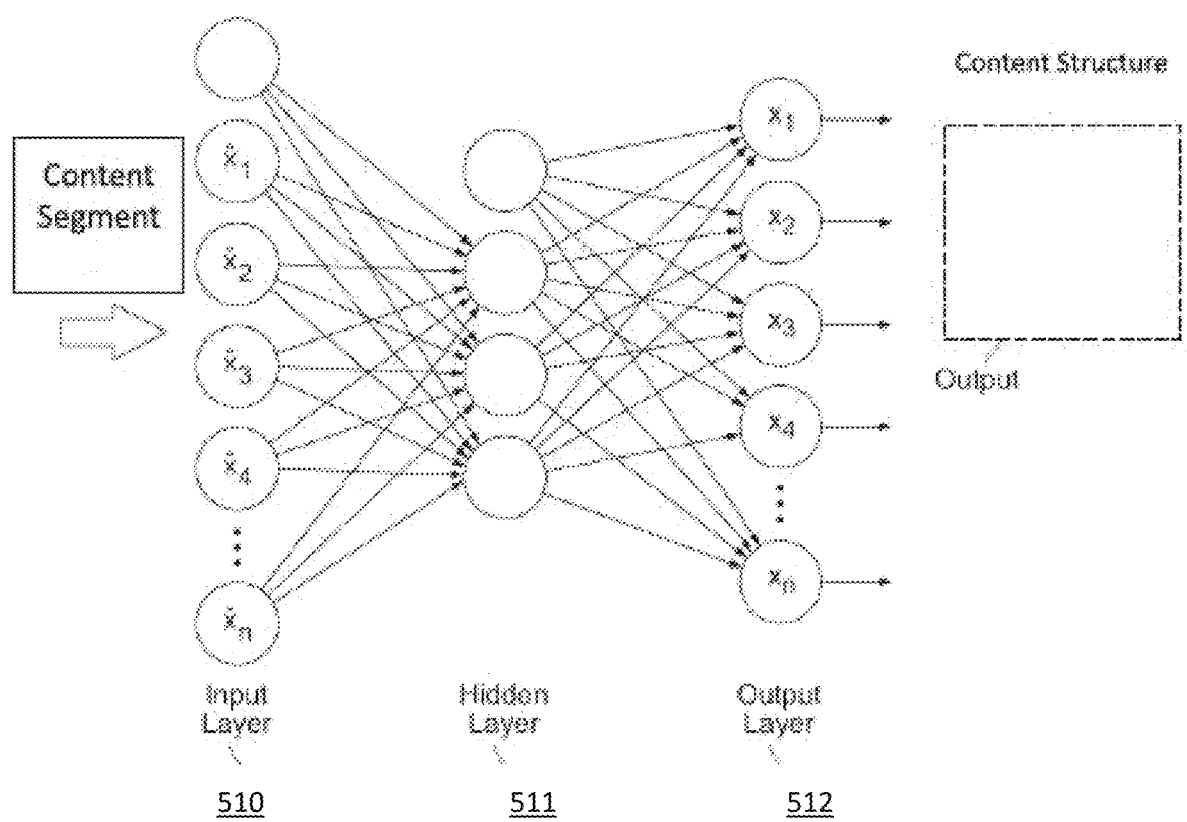
FIG. 5 provides an example diagram illustrating the process of training and generating content structure via an artificial neural network, according to some embodiments described herein.

FIG. 5 provides an example diagram illustrating the process of training and generating content structure 133 via an artificial neural network, according to some embodiments described herein. An artificial neural network may be trained to recognize objects, scenes, audios, settings, effects, etc., from a content segment. Content segment 122a can then be fed to the input layer 610 of the artificial neural network. For example, various visual representations may indicate the same type of object, scene, etc. The artificial neural network may be trained to identify the common pattern from different visualizations via processing at one or more hidden layers 511. Thus, by identifying objects, scenes, audios, settings, effects, etc., from the content segment, an output of the content structure 133 is generated at the output layer 512.

FIGS. 6A-B provide pseudo-code examples of content structure 133, according to some embodiments described herein. Content structure 133 may be stored in a structured data format compatible with XML, JSON, Python, etc. For example, FIG. 6A shows an example segment of attribute table 131 that lists a hierarchical structure of data fields for the attribute table 131, under which object data structure 134 is listed, under which the description structure 135 is listed, under which an object 111 is listed, under which a number of features of the object 111 are listed, and so on.

FIG. 6B shows an example segment of mapping 132. For example, mapping 132 specifies the object identifier for object 111, and the presence indicator of a time duration "0:00-00:11" during which object 111 is present within the content segment 122a. Mapping 132 also specifies a mapping for the object state attribute, e.g., [0,00:00-00:02, 27] indicates a state of code "0" (e.g., referring to the state of "determined") having a degree of "27" (e.g., 27 out of 100, referring to "moderately determined") during the time duration "00:00-00:02." The state mapping may change to [1, 00:02-00:05, 35], which indicates a state of code "1" (e.g., referring to the state of "intense") having a degree of "35" (e.g., 35 out of 100 level of "intense") during time duration "00:02-00:05," and so on.

Figure 7:
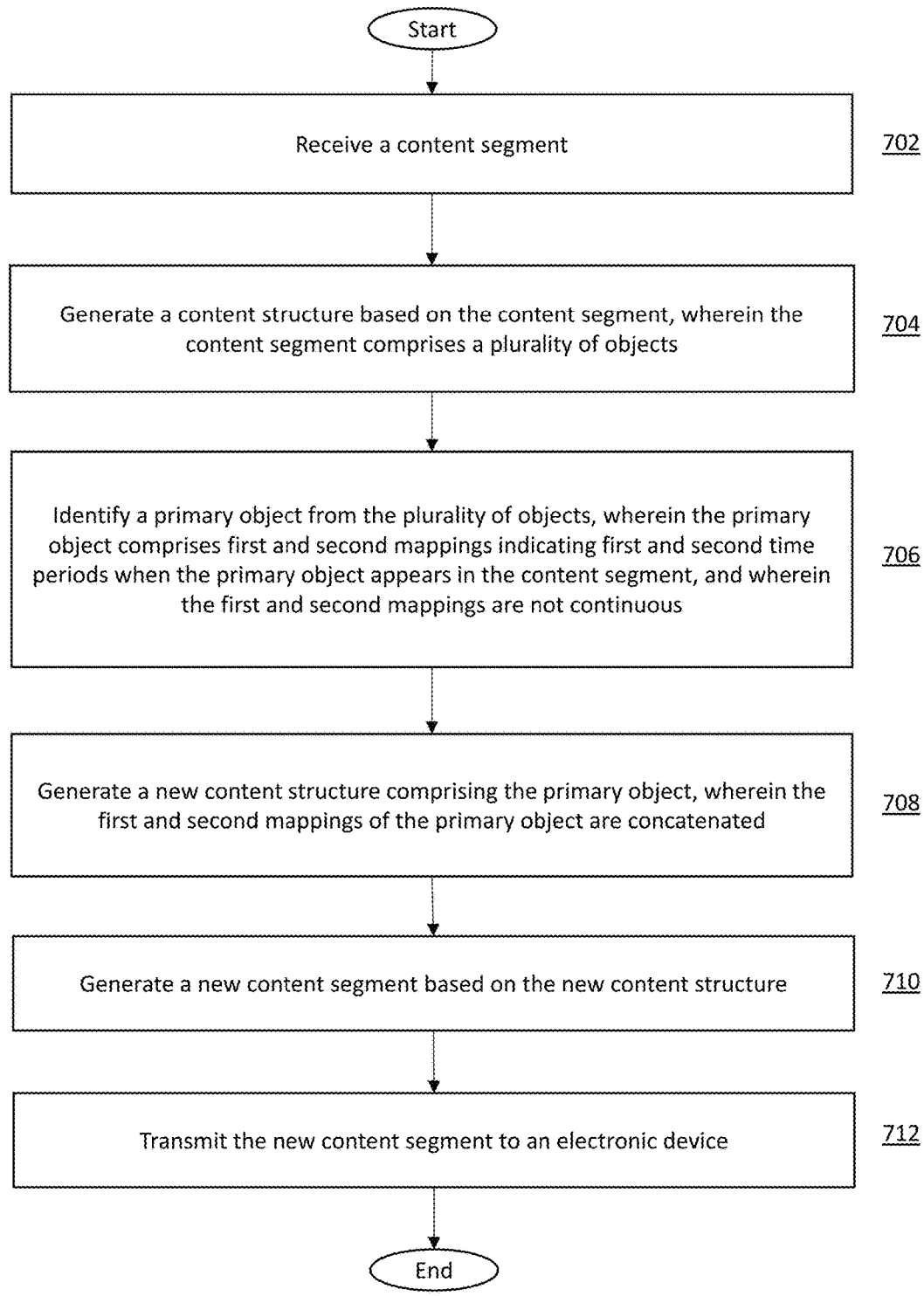
FIG. 7 is an illustrative flowchart of a process for generating new media content structures from content segments, in accordance with some embodiments of the disclosure.

FIG. 7 is an illustrative flowchart of a process 700 for generating new media content structures from content segments, in accordance with some embodiments of the disclosure. Process 700, and any of the following processes, may be executed by control circuitry 404 (e.g., in a manner instructed to control circuitry 404 by the processing engine 402 and/or construction engine 304 and/or deconstruction engine 305). Control circuitry 404 may be part of a network optimizer, or of a remote server separated from the network optimizer by way of a communication network, or distributed over a combination of both.

At 702, the processing engine 402, by control circuitry 404, receives a content segment. In some embodiments, the processing engine 402 receives the content segment from a server or devices 306-309 via the I/O path 406.

At 704, the processing engine 402, by control circuitry 404, generates a content structure based on the content segment including a plurality of objects. In some embodiments, the deconstruction engine 305 deconstructs the content segment into a plurality of objects. In some embodiments, the construction engine 304 generates a content structure based on the content segment including a plurality of objects. In some embodiments, the processing engine utilizes image recognition techniques to identify the objects from the content segment. In some embodiments, the image recognition techniques are performed, at least in part, by processing circuitry 408.

At 706, the processing engine 304, by control circuitry 404, identifies a primary object from the plurality of objects. In some embodiments, the primary object includes first and second mappings indicating first and second time periods when the primary object appears in the content segment. In some embodiments, the first and second mappings are not continuous. In some embodiments, the identification of the primary object is performed, at least in part, by processing circuitry 408.

At 708, the processing engine 402, by control circuitry 404, generates a new content structure comprising the primary object. In some embodiments, the first and second mappings of the primary object are concatenated. In some embodiments, the construction engine 304 generates the new content structure. In some embodiments, generating the new content structure is performed, at least in part, by processing circuitry 408.

At 710, the processing engine 402, by control circuitry 404, generates a new content segment based on the new content structure. In some embodiments, the construction engine 304 generates the new content segment. In some embodiments, generating the new content segment is performed, at least in part, by processing circuitry 408.

At 712, the processing engine 402, by control circuitry 404, transmits the new content segment to an electronic device. In some embodiments, the processing engine 402 transmits the new content to one of devices 306-309 over the I/O path 406.

Figure 8:
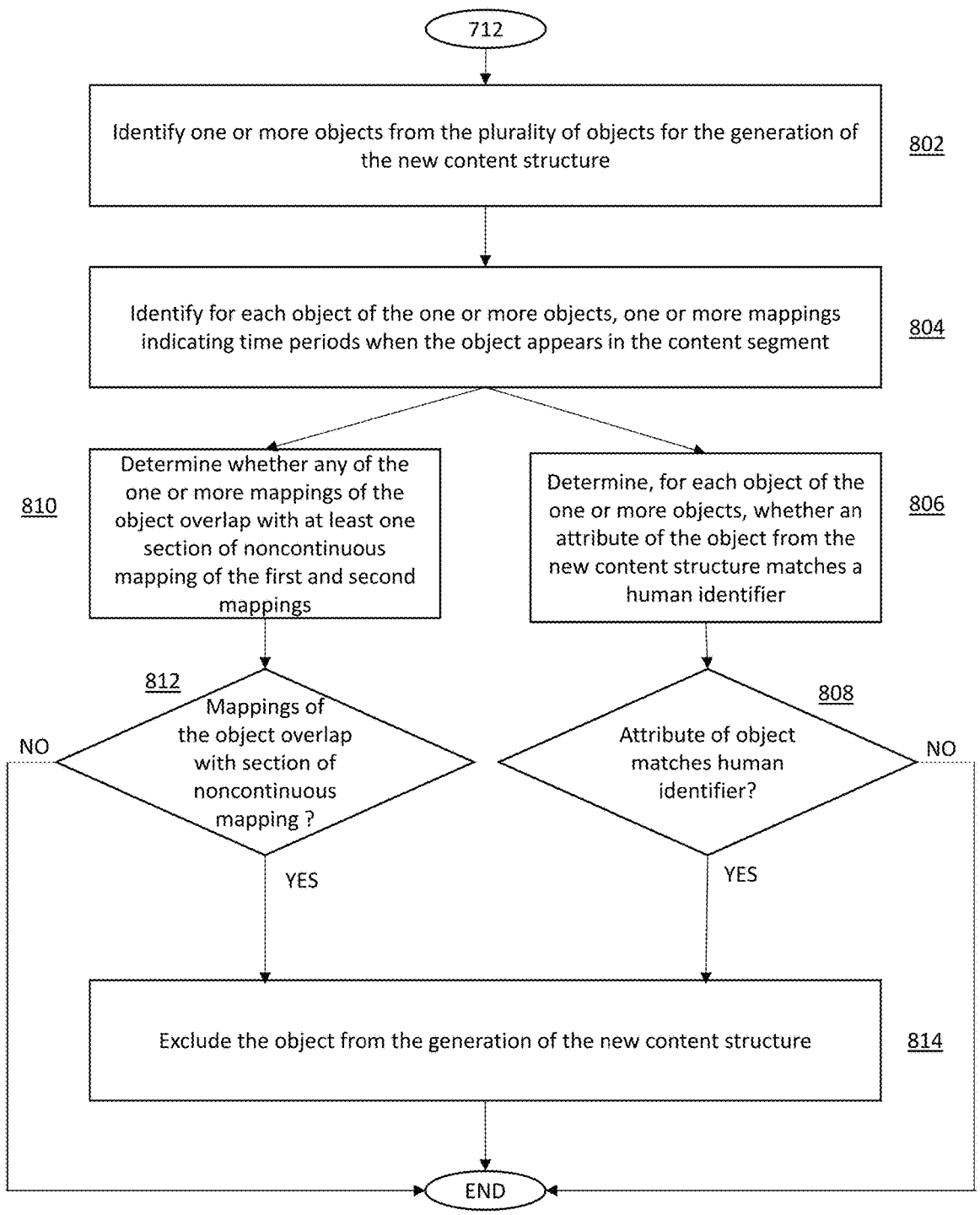
FIG. 8 is an illustrative flowchart of a process for excluding an object from the generation of a new content structure, in accordance with some embodiments of the disclosure.

FIG. 8 is an illustrative flowchart of a process 800 for excluding an object from the generation of a new content structure, in accordance with some embodiments of the disclosure. At 802, the processing engine 402, by control circuitry 404, identifies one or more objects from the plurality of objects for the generation of the new content structure. In some embodiments, the processing engine utilizes image recognition techniques to identify the objects from the content segment. In some embodiments, the image recognition techniques are performed, at least in part, by processing circuitry 408.

At 804, the processing engine 402, by control circuitry 404, identifies for each object of the one or more objects, one or more mappings indicating time periods when the object appears in the content segment. In some embodiments, the identification of mappings is performed, at least in part, by processing circuitry 408.

In one embodiment, at 810, the processing engine 402, by control circuitry 404, determines whether any of the one or more mappings of the object overlap with at least one section of noncontinuous mapping of the first and second mappings. In some embodiments, the determination of whether any of the one or more mappings of the object overlap is performed, at least in part, by processing circuitry 408. If, at 812, control circuitry determines "No," the one or more mappings of the object do not overlap with at least one section of noncontinuous mapping of the first and second mappings, the process advances to END. If, at 812, control circuitry determines "Yes," the one or more mappings of the object overlap with at least one section of noncontinuous mapping of the first and second mappings, the process advances to 814. At 814, the processing engine 402, by control circuitry 404, excludes the object from the generation of the new content structure. In some embodiments, the exclusion of the object from the generation of the new content structure is performed, at least in part, by the construction engine 304.

In another embodiment, at 806, the processing engine 402, by control circuitry 404, determines for each object of the one or more objects, whether an attribute of the object from the new content structure matches a human identifier. In some embodiments, the determination is performed, at least in part, by processing circuitry 408. If, at 808, control circuitry determines "No," the attribute of the object from the new content structure does not match the human identifier, the process advances to END. If, at 808, control circuitry determines "Yes," the attribute of the object from the new content structure matches the human identifier, the process advances to 814. At 814, the processing engine 402, by control circuitry 404, excludes the object from the generation of the new content structure. In some embodiments, the exclusion of the object from the generation of the new content structure is performed, at least in part, by the construction engine 304.

Figure 9:
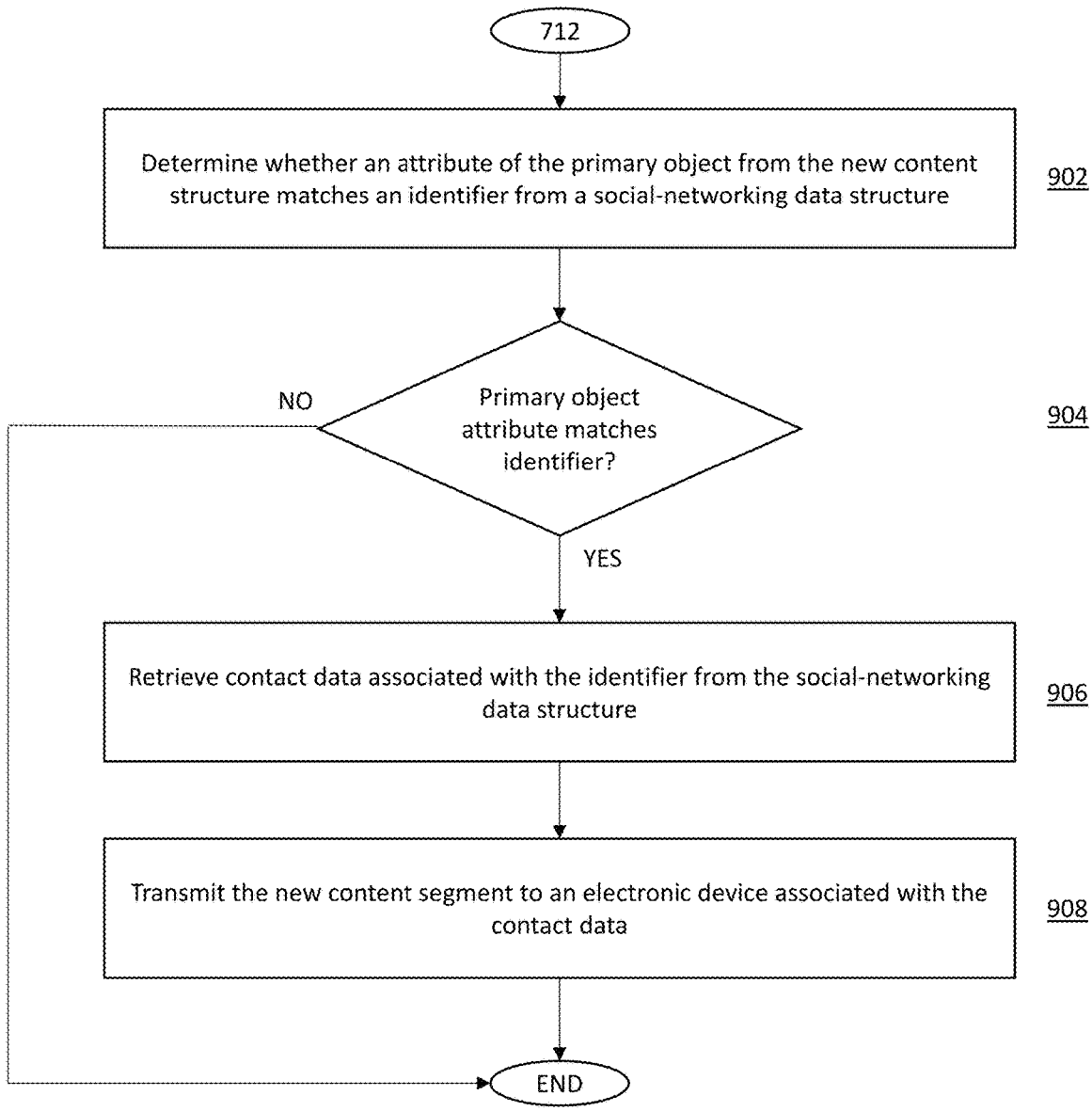
FIG. 9 is an illustrative flowchart of a process for determining whether an attribute of a primary object from a new content structure matches an identifier from a social-networking data structure, in accordance with some embodiments of the disclosure.

FIG. 9 is an illustrative flowchart of a process 900 for determining whether an attribute of a primary object from a new content structure matches an identifier from a social-networking data structure, in accordance with some embodiments of the disclosure. At 902, the processing engine 402, by control circuitry 404, determines whether an attribute of the primary object from the new content structure matches an identifier from a social-networking data structure. If, at 904, control circuitry determines "No," the attribute of the primary object from the new content structure does not match the identifier from the social-networking data structure, the process advances to END. If, at 904, control circuitry determines "Yes," the attribute of the primary object from the new content structure matches the identifier from the social-networking data structure, the process advances to 906. At 906, the processing engine 402, by control circuitry 404, retrieves contact data associated with the identifier from the social-networking data structure. In some embodiments, the processing engine 402 retrieves contact data from a server via the I/O path 406.

At 908, the processing engine 402, by control circuitry 404, transmits the new content segment to an electronic device associated with the contact data. In some embodiments, the processing engine 402 transmits the new content segment to an electronic device associated with the contact data to devices 306-309 via the I/O path 406.

Figure 10:
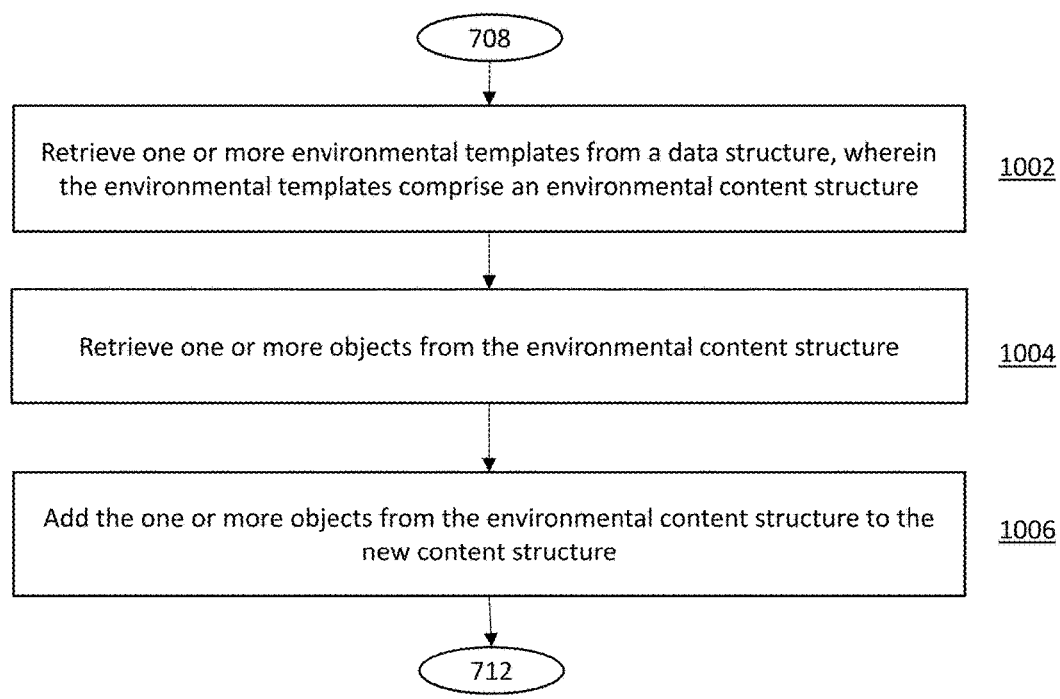
FIG. 10 is an illustrative flowchart of a process for adding one or more objects from an environmental content structure to a new content structure, in accordance with some embodiments of the disclosure.

FIG. 10 is an illustrative flowchart of a process 1000 for determining whether an attribute of a primary object from a new content structure matches an identifier from a social-networking data structure, in accordance with some embodiments of the disclosure. At 1002, the processing engine 402, by control circuitry 404, retrieves one or more environmental templates from a data structure, wherein the environmental templates comprise an environmental content structure. In some embodiments, the processing engine 402 retrieves the one or more environmental templates from a data structure via the I/O path 406.

At 1004, the processing engine 402, by control circuitry 404, retrieves one or more objects from the environmental content structure. In some embodiments, the processing engine 402 retrieves one or more objects from the environmental content structure via the I/O path 406.

At 1006, the processing engine 402, by control circuitry 404, adds the one or more objects from the environmental content structure to the new content structure. In some embodiments, the processing engine 402 adds the one or more objects from the environmental content structure to the new content structure via the I/O path 406. In some embodiments, the adding of the one or more objects from the environmental content structure to the new content structure is performed, at least in part, by the construction engine 304.

FIG. 11 is an illustrative flowchart of a process 1100 for generating new content segments based on object name identification, in accordance with some embodiments of the disclosure. At 1102, the processing engine 402, by control circuitry 404, receives a content segment. In some embodiments, the processing engine 402 receives the content segment from a server or devices 306-309 via the I/O path 406.

At 1104, the processing engine 402, by control circuitry 404, generates a content structure based on the content segment including a plurality of objects including a first object and an attribute of the first object. In some embodiments, the deconstruction engine 305 deconstructs the content segment into a plurality of objects. In some embodiments, the construction engine 304 generates a content structure based on the content segment including a plurality of objects including a first object and an attribute of the first object. In some embodiments, the processing engine utilizes image recognition techniques to identify the objects from the content segment. In some embodiments, the image recognition techniques are performed, at least in part, by processing circuitry 408.

At 1106, the processing engine 304, by control circuitry 404, searches a contact database associated with the device to identify a matching entry of the contact database based on comparing metadata of the matching entry with the attribute of the first object. In some embodiments, the processing engine searches the contact database via the I/O path 406. In some embodiments, the identification of the matching entry is performed, at least in part, by processing circuitry 408.

At 1108, the processing engine 402, by control circuitry 404, modifies the first object to include a name attribute based on the metadata of the matching entry of the contact database. In some embodiments, the modification of the first object to include a name attribute based on the metadata of the matching entry of the contact database is performed, at least in part, by the construction engine 304. If, at 1110, control circuitry determines "No," a request was not received to create a new content segment including a name attribute of the first object, the process advances to END.

If, at 1110, control circuitry determines "Yes," a request was received to create a new content segment including a name attribute of the first object, the process advances to 1112. At 1112, the processing engine 402, by control circuitry 404, inserts the first object into a new content structure. In some embodiments, the insertion of the first object into a new content structure is performed, at least in part, by the construction engine 304.

At 1114, the processing engine 402, by control circuitry 404, generates for display a new content segment based on the new content structure. In some embodiments, the generation for display of a new content segment based on the new content structure is performed, at least in part, by the construction engine 304.

Figure 12:
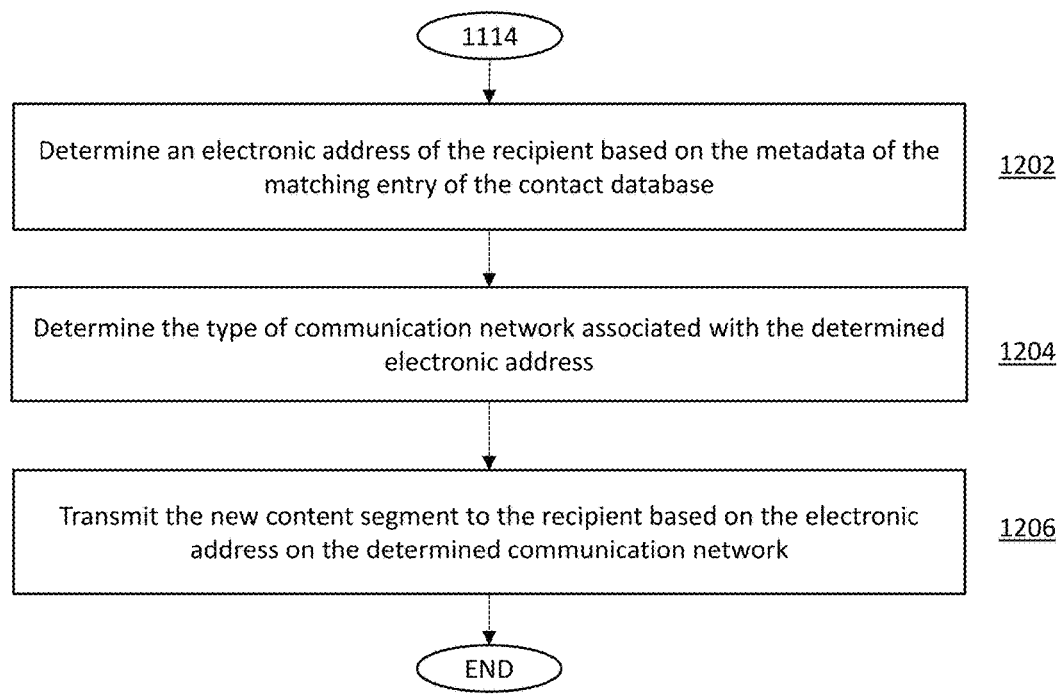
FIG. 12 is an illustrative flowchart of a process for transmitting the new content segment to a recipient based on an electronic address, in accordance with some embodiments of the disclosure.

FIG. 12 is an illustrative flowchart of a process 1200 for transmitting the new content segment to a recipient based on an electronic address, in accordance with some embodiments of the disclosure. At 1202, the processing engine 402, by control circuitry 404, determines an electronic address of the recipient based on the metadata of the matching entry of the contact database.

At 1204, the processing engine 402, by control circuitry 404, determines the type of communication network associated with the determined electronic address. In some embodiments, the determination is performed, at least in part, by processing circuitry 408.

At 1206, the processing engine 402, by control circuitry 404, transmits the new content segment to the recipient based on the electronic address on the determined communication network. In some embodiments, the processing engine 402 transmits the new content segment to the recipient via the I/O path 406.

It is contemplated that the steps or descriptions of FIGS. 7-12 may be used with any other embodiment of this disclosure. In addition, the steps and descriptions described in relation to FIGS. 7-12 may be done in suitable alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3A, 3B, and 4 could be used to perform one or more of the steps in FIGS. 7-12.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for generating new content segments based on object name identification, the method comprising:
   receiving a content segment from a device;
   generating a content structure based on the content segment, wherein the content structure comprises a plurality of objects including a first object and an attribute of the first object;
   searching a contact database associated with the device to identify a matching entry of the contact database based on comparing metadata of the matching entry with the attribute of the first object;
   modifying the first object to include a name attribute based on the metadata of the matching entry of the contact database; and
   in response to receiving a request to create a new content segment, wherein the request comprises the name attribute of the first object:
      inserting the first object into a new content structure;
      generating for display a new content segment based on the new content structure; and
      transmitting the new content segment to a recipient identified based on the metadata of the matching entry of the contact database, wherein transmitting the new content segment to the recipient comprises:
         determining an electronic address of the recipient based on the metadata of the matching entry of the contact database;
         determining the type of communication network associated with the determined electronic address; and
         transmitting the new content segment to the recipient based on the electronic address on the determined communication network.

2. The method of claim 1, wherein comparing metadata of the matching entry with the attribute of the first object comprises:
   comparing, using an image recognition technique, an image from the matching entry with the attribute of the first object.

3. The method of claim 2, wherein the image recognition technique comprises a machine learning model implemented on control circuitry, and wherein the machine learning model implements at least one of a neural network or parallel processing.

4. The method of claim 1, wherein the matching entry of the contact database comprises a profile picture.

5. The method of claim 1, wherein each of the plurality of objects comprises a plurality of attributes and wherein one attribute of the plurality of attributes is a vectorized representation of the object.

6. The method of claim 5, wherein the vectorized representation of the first object comprises vectorized representation of a sub-portion of the first object.

7. The method of claim 5, further comprising:
modifying the vectorized representation of the object comprising removing a portion of vectors of the vectorized representation of the object and adding new vectors to the vectorized representation of the object.

8. The method of claim 5, further comprising:
modifying the vectorized representation of the object comprises modifying a vectorized representation of a sub-portion of the object.

9. A system for generating new content segments based on object name identification, comprising:
control circuitry configured to:
receive a content segment from a device;
generate a content structure based on the content segment, wherein the content structure comprises a plurality of objects including a first object and an attribute of the first object;
search a contact database associated with the device to identify a matching entry of the contact database based on comparing metadata of the matching entry with the attribute of the first object;
modify the first object to include a name attribute based on the metadata of the matching entry of the contact database; and
in response to receiving a request to create a new content segment, wherein the request comprises the name attribute of the first object:
insert the first object into a new content structure;
generate for display a new content segment based on the new content structure; and
transmit the new content segment to a recipient identified based on the metadata of the matching entry of the contact database, wherein the control circuitry is further configured, when transmitting the new content segment to the recipient, to:
determine an electronic address of the recipient based on the metadata of the matching entry of the contact database;
determine the type of communication network associated with the determined electronic address; and
transmit the new content segment to the recipient based on the electronic address on the determined communication network.

10. The system of claim 9, wherein the control circuitry is further configured, when comparing metadata of the matching entry with the attribute of the first object, to:
compare, using an image recognition technique, an image from the matching entry with the attribute of the first object.

11. The system of claim 10, wherein the image recognition technique comprises a machine learning model implemented on control circuitry, and wherein the machine learning model implements at least one of a neural network or parallel processing.

12. The system of claim 9, wherein the matching entry of the contact database comprises a profile picture.

13. The system of claim 9, wherein each of the plurality of objects comprises a plurality of attributes and wherein one attribute of the plurality of attributes is a vectorized representation of the object.

14. The system of claim 13, wherein the vectorized representation of the first object comprises vectorized representation of a sub-portion of the first object.

15. The system of claim 13, wherein the control circuitry is further configured to:
modify the vectorized representation of the object comprising removing a portion of vectors of the vectorized representation of the object and adding new vectors to the vectorized representation of the object.

16. The system of claim 13, wherein the control circuitry is further configured to:
modify the vectorized representation of the object comprises modifying a vectorized representation of a sub-portion of the object.

* * * * *